Feb. 11, 1964 E. A. IRLAND 3,121,197

VOICE-FREQUENCY BINARY DATA TRANSMISSION WITH RETURN SIGNAL

Filed March 8, 1960

9 Sheets-Sheet 1

INVENTOR
E. A. IRLAND
BY Henry M. Bissell
ATTORNEY

Feb. 11, 1964 E. A. IRLAND 3,121,197

VOICE-FREQUENCY BINARY DATA TRANSMISSION WITH RETURN SIGNAL

Filed March 8, 1960 9 Sheets-Sheet 2

INVENTOR
E. A. IRLAND
BY Henry M. Bissell
ATTORNEY

VOICE-FREQUENCY BINARY DATA TRANSMISSION WITH RETURN SIGNAL

Filed March 8, 1960 9 Sheets-Sheet 3

INVENTOR
E. A. IRLAND
BY Henry M. Bissell
ATTORNEY

VOICE-FREQUENCY BINARY DATA TRANSMISSION WITH RETURN SIGNAL

Filed March 8, 1960 9 Sheets-Sheet 4

INVENTOR
E. A. IRLAND
BY Henry M. Bissell
ATTORNEY

Feb. 11, 1964 E. A. IRLAND 3,121,197

VOICE-FREQUENCY BINARY DATA TRANSMISSION WITH RETURN SIGNAL

Filed March 8, 1960 9 Sheets-Sheet 5

INVENTOR
E. A. IRLAND
BY Henry M. Bissell
ATTORNEY

INVENTOR
E. A. IRLAND
BY Henry M. Bissell
ATTORNEY

INVENTOR
E. A. IRLAND
BY Henry M. Bissell
ATTORNEY

INVENTOR
E. A. IRLAND
BY Henry M. Bissell
ATTORNEY

INVENTOR
E. A. IRLAND
BY Henry M. Bissell
ATTORNEY 3,121,197

VOICE-FREQUENCY BINARY DATA TRANSMISSION SYSTEM WITH RETURN SIGNAL

Edwin A. Irland, Hanover, N.J., assignor to Bell Telephone Laboratories, Incorporated, New York, N.Y., a corporation of New York Filed Mar. 8, 1960, Ser. No. 13,464
19 Claims. (Cl. 325—30)

This invention relates to an information transmission system and more specifically to such a system for transferring information from a remote line circuit group to a central office location in a telephone communication network.

In modern electronic telephone switching systems it is advantageous to have a major portion of the switching network control functions performed by equipment which is common to a substantial number of the telephone lines being served. Such common control equipment, while more complex than the equipment formerly individually associated with each telephone line, increases the over-all efficiency of the system by substantially reducing the total equipment cost.

In copending application Serial No. 13,649, filed March 8, 1960, of M. E. Alterman and E. A. Irland, now U.S. Patent 3,073,907, there is disclosed a line scanning circuit which may be associated with a plurality of telephone sets, or lines, remote from a central office. Use for such an arrangement will be found, for example, in a private branch exchange (PBX) system which is part of an electronic telephone switching system. The line scanning circuit provides information at the remote location relative to the binary address and condition of a line requiring service from the central office common control equipment.

Ordinary telephone lines are not engineered to have a broad frequency response. Therefore a modulated carrier frequency which is to be transmitted over such a line must necessarily be of relatively low frequency, customarily below 10 kilocycles. Similarly, direct current pulses tend to become mutilated when transmitted in rapid succession over such a telephone line; yet it is desirable to transfer binary information at a rate approaching 500 binary digits per second between the satellite PBX and the common control equipment in the central office. This presents the problem of employing a carrier frequency which is not significantly greater than the information bearing frequency. As a result, only a limited number of cycles of the carrier frequency can occur in the time interval assigned to an individual information signal. Under such circumstances, it is difficult to achieve error-free demodulation of such a signal by known techniques without resorting to equipment of considerable complexity.

It is, therefore, an object of this invention to relay binary coded information at a rapid rate from a remote location to common control equipment located in a telephone central office.

More specifically, it is an object of this invention to transmit such information over an ordinary telephone line.

Further objects of this invention are to transfer such information efficiently and expeditiously and to signal the remote equipment when the transfer is completed.

One specific embodiment of this invention comprises a data transmitter, situated at a remote location and connected to a line scanning circuit thereat, and a data receiver located adjacent the common control equipment in the central office. The data transmitter contains a data serializer which converts the parallel presentation of the binary information at the line scanner to a series of successive binary digits, either "1's" or "0's." These binary digits, in accordance with this invention, are applied so as to select one of two available synchronous harmonic frequencies for transmission to the data receiver. Transition between the two harmonic frequencies advantageously takes place at the zero crossings of the signal wave in order to provide maximum energy within the signaling band, protect against noise interference and reduce the quantity and complexity of the modulation and demodulation circuitry.

In the data receiver of this specific embodiment of my invention, the transmitter frequencies are identified within the period of one basic signal frequency cycle and corresponding binary digital signals are generated which are then stored in a shift register. When the complete information has been stored in the shift register, a signal is sent to the associated common control circuit which thereupon reads the information from the shift register and applies a return signal for transmission to the remote location where it signals the line scanner to resume its scanning cycle. The regeneration of the binary code signals in the data receiver is accomplished by circuitry which advantageously protects against the generation of spurious signals in response to noise pulses on the interconnecting telephone line.

It is a feature of this invention that the connection between a transmission line and one or another of a plurality of harmonic signal frequencies be shifted at the zero point of the signal waves.

It is a more specific feature of this invention to provide for the shifting between such harmonic signal frequencies by means of a complementary pair of transistors controlled by a common input signal.

It is a further feature of this invention that the circuitry which shifts from one to another of a plurality of harmonically related signals at the zero crossings of their signal waveforms be controlled by pulses which are themselves synchronized with the above-mentioned signals.

It is another feature of this invention to produce an individual pulse on one of a pair of lines in the event that more than one cycle of an input signal occurs within a given time and to produce a single pulse on the other line in the event that only one cycle of an input frequency occurs within the same given time.

A complete understanding of this invention and of these and various other features thereof may be gained from consideration of the following detailed description and the accompanying drawing in which:

FIG. 1 despicts in block diagram form elements of a telephone system control network including one specific embodiment of this invention;

FIGS. 2 and 3 are block diagrams of different potrions of the embodiment of my invention depicted in FIG. 1;

FIGS. 4, 5, and 6 are schematic representations of the portion of the invention depicted in FIG. 2;

Figure 1:
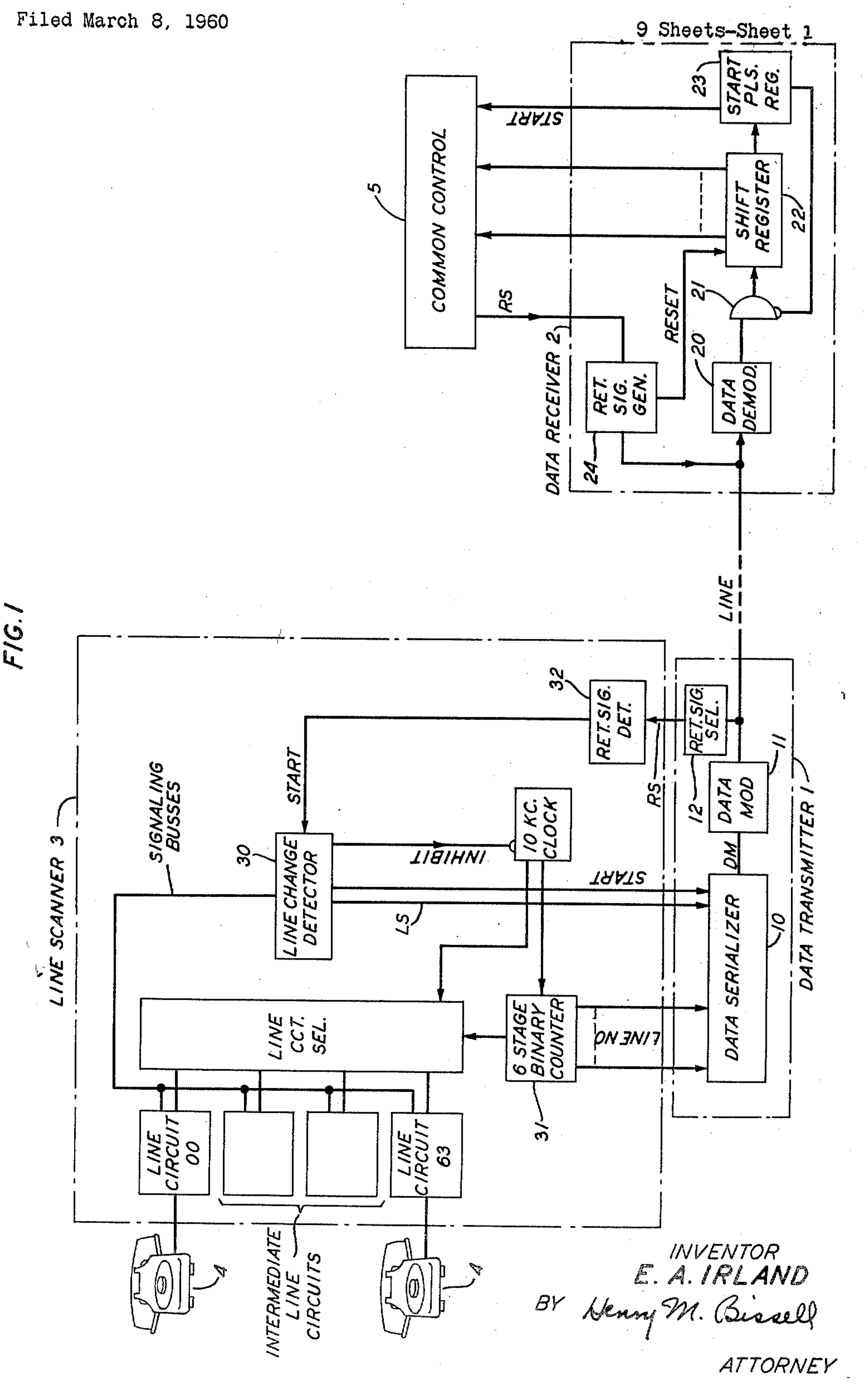

In FIG. 1 one specific embodiment of my invention comprising a data transmitter 1 and a data receiver 2 is depicted in conjunction with common control equipment 5 in a telephone central office and with a line scanning circuit 3 which is associated with a plurality of telephone sets 4 at a remote location. The line scanning circuit 3 is described in detail in the above-cited copending application of M. E. Alterman and E. A. Irland. For the purpose of this disclosure, it may be considered to provide to the data transmitter 1 a start signal, a line service request indication over lead LS from the line change detector 30 and a plurality of binary digital information signals from a binary counter 31 which correspond to the binary address of the particular line requesting service. In addition, the line scanning circuit 3 requires a pulse over lead RS to its return signal detector 32 from the data transmitter 1 which will signal the resumption of line scanning.

The data transmitter 1 as shown in FIG. 1 comprises a data serializer 10 which selects the information presented by the corresponding leads from the line scanner 3 in successive time intervals. The data serializer 10 controls a data modulator 11, causing it to apply one or the other of a pair of synchronous harmonically related alternating current signals to a line leading to the data receiver 2 in the central office in accordance with the serialized binary digital signals developed from the line scanner information. Also included in the data transmitter 1 is a return signal selector circuit 12 which responds to a signal of a particular frequency generated in the data receiver 2 while rejecting the signals of other frequencies coming from the data modulator 11.

The data receiver 2 comprises a data demodulator 20 connected to a shift register 22 by a shift register control circuit 21 for storing information recieved from the data transmitter 1 in the shift register 22. A start pulse register 23 is connected to the shift register 22 for signaling the common control circuit 5 to receive the information from the shift register 22. The start pulse register 23 when energized also inhibits the circuit 21 to prevent the application of spurious information to the shift register 22. A return signal generator 24, responsive to a return signal from the common control equipment 5, is provided to generate a signal to reset the shift register 22 and to signal the line scanning circuit 3 to resume scanning.

Figure 2:
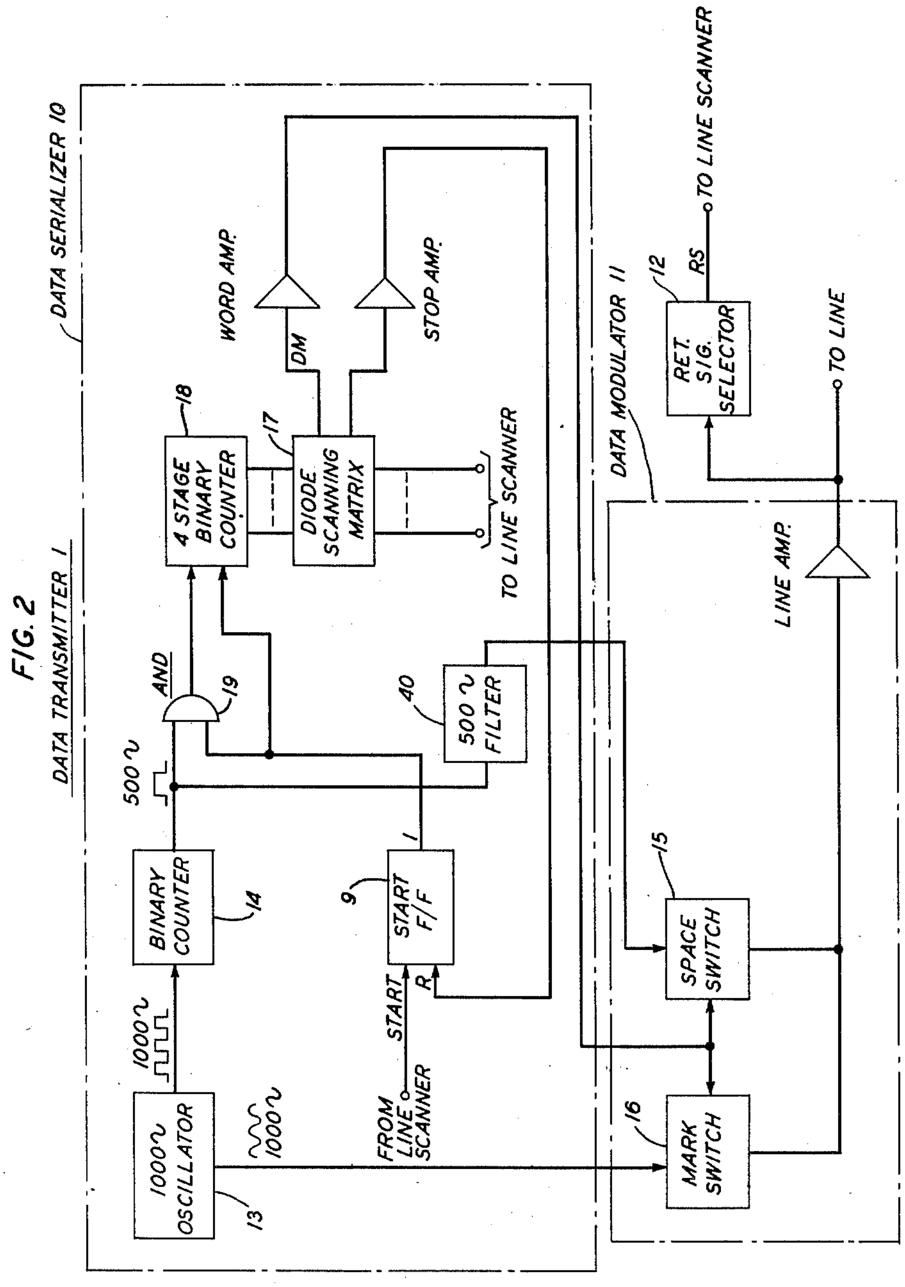

In FIG. 2, the data transmitter 1 of FIG. 1 is depicted in greater detail. In the data serializer 10 there is shown a 1000-cycle oscillator 13 which produces both a 1000-cycle square wave and a 1000-cycle sine wave as outputs. The 1000-cycle square wave is fed to a binary counter 14 which produces a 500-cycle square wave synchronized with the input wave. This is transformed by a filter 40 to a 500-cycle sine wave which is directed to the SPACE switch 15 in the data modulator 11. The 1000-cycle sine wave from the oscillator 15 is directed to the MARK switch 16 in the data modulator 11. Both of the switches 15 and 16 are controlled by signals from the line scanner derived by means of the diode scanning matrix 17 under the control of binary counter 18. The counter 18 receives 500-cycle pulses from the counter 14 through an AND gate 19 which is enabled by the START flip-flop 9 which in turn is triggered by the start pulse from the line scanner. Thus when information is to be transferred from the line scanner, harmonic signal frequencies of 500 and 1000 cycles per second are selectively applied to the output line in accordance with the binary information contained in the line scanner.

Figure 3:
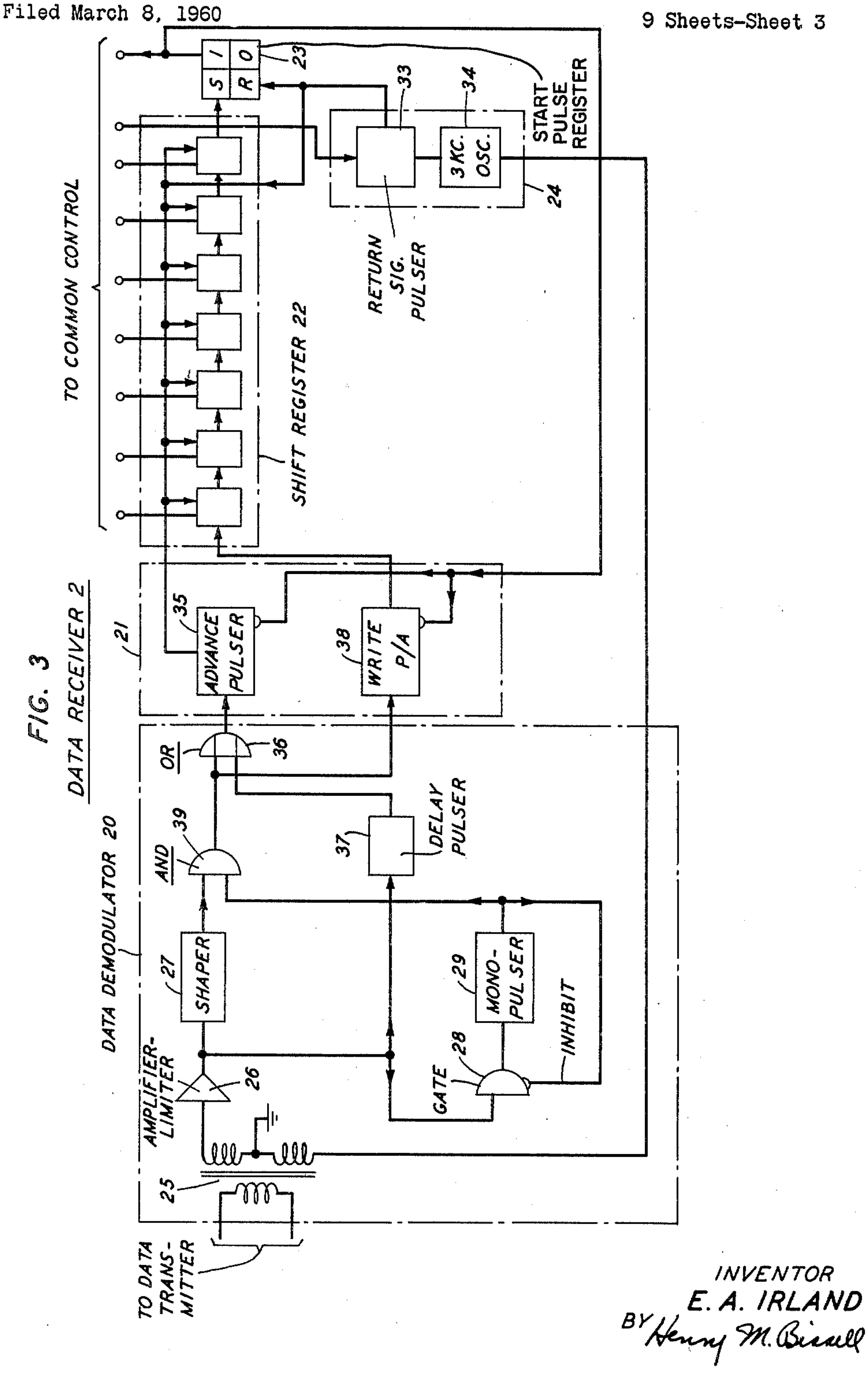

FIG. 3 depicts the data receiver 2 of FIG. 1 in greater detail. In FIG. 3 the data demodulator 20 is shown comprising a transformer 25 feeding signals to an amplifier-limiter 26, the output of which is directed to a pulse shaping circuit 27 and to a normally enabled gate 28. The output of the gate 28 is applied to a monopulser 29 which produces a 1.5 millisecond pulse that enables the AND gate 39 at the output of the shaper 27 and inhibits the gate 28, thus blocking its own input signal path. As a result, the second cycle received within a 1.5 millisecond time interval is passed through the AND gate 39 to the WRITE pulse amplifier 38, causing it to store the binary digit "1" in the shift register 22.

Also connected to the output of the amplifier-limiter 26 is a DELAY pulser 37 which is arranged to produce a signal in the absence of a second cycle of input sine wave within a one-millisecond time interval. Outputs from the AND gate 39 and the DELAY pulser 37 are applied through an OR gate 36 to the ADVANCE pulser 35 which causes the shifting of information between stages in the shift register 22. Thus it can be seen that two cycles of a 1000-cycle frequency produce the storage of a binary "1" in the first stage of the shift register 22 while a single cycle of a 500-cycle signal produces the storage of a binary "0" (which is simply the absence of a binary "1") in the first stage of the shift register 22. Input signals of either frequency cause the information stored in the shift register 22 to be advanced from stage to stage therein once during each time interval of 2 milliseconds.

The first signal of a series of input frequencies is the start signal which is always a binary "1." When this reaches the start pulse register 23 at the end of the shift register 22, it causes a signal to be sent to common control and also inhibits the ADVANCE pulser 35 and the WRITE pulse amplifier 38 to prevent any change in the stored information. The common control equipment then reads out the information stored in the shift register 22, after which it applies a signal to the return signal pulser 33 causing the oscillator 34 to generate a brief burst of 3000-cycle tone that is sent back through the transformer 25 to the data transmitter to signal the resumption of line scanning.

Figure 4:
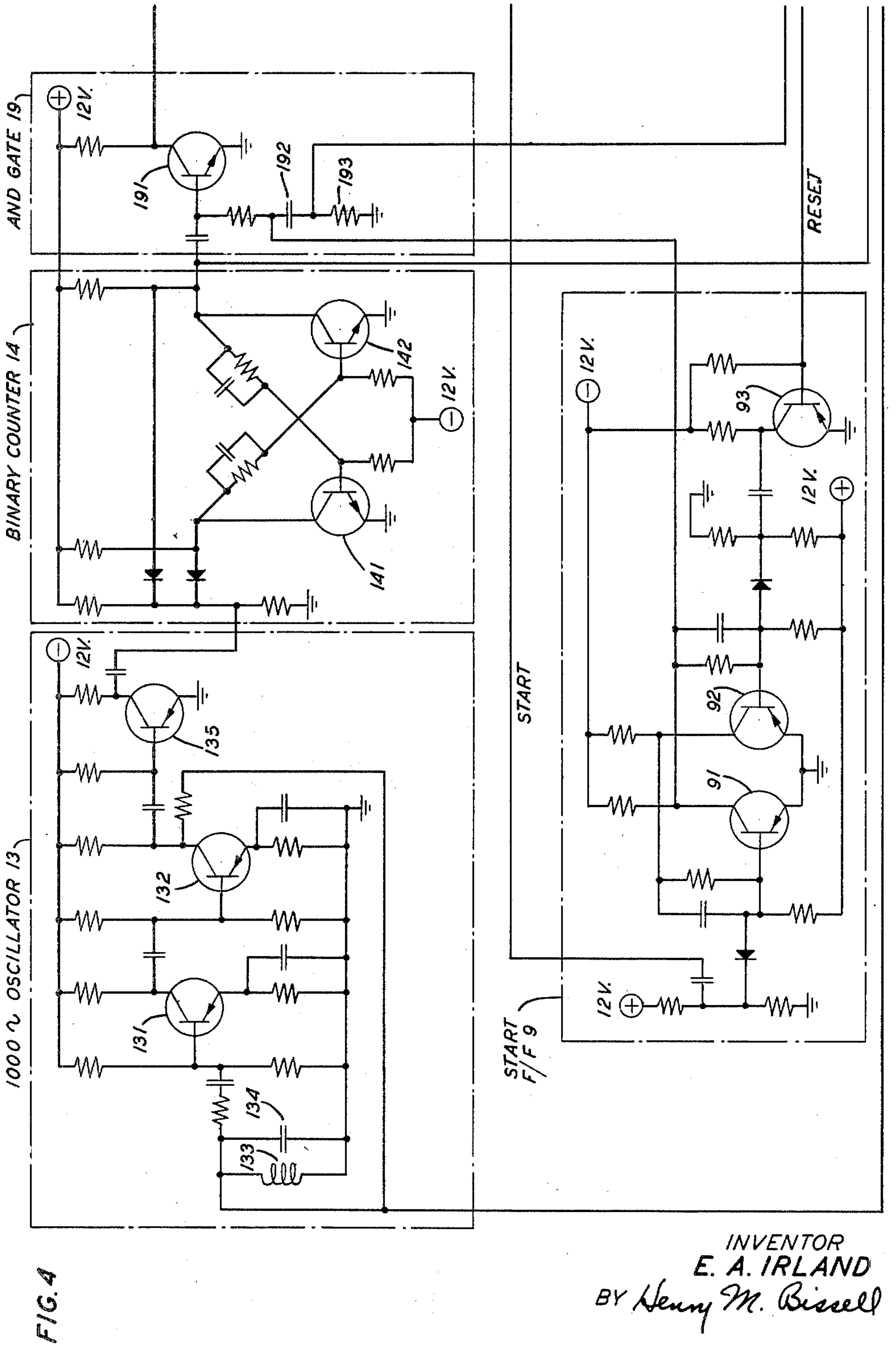
Figure 5:
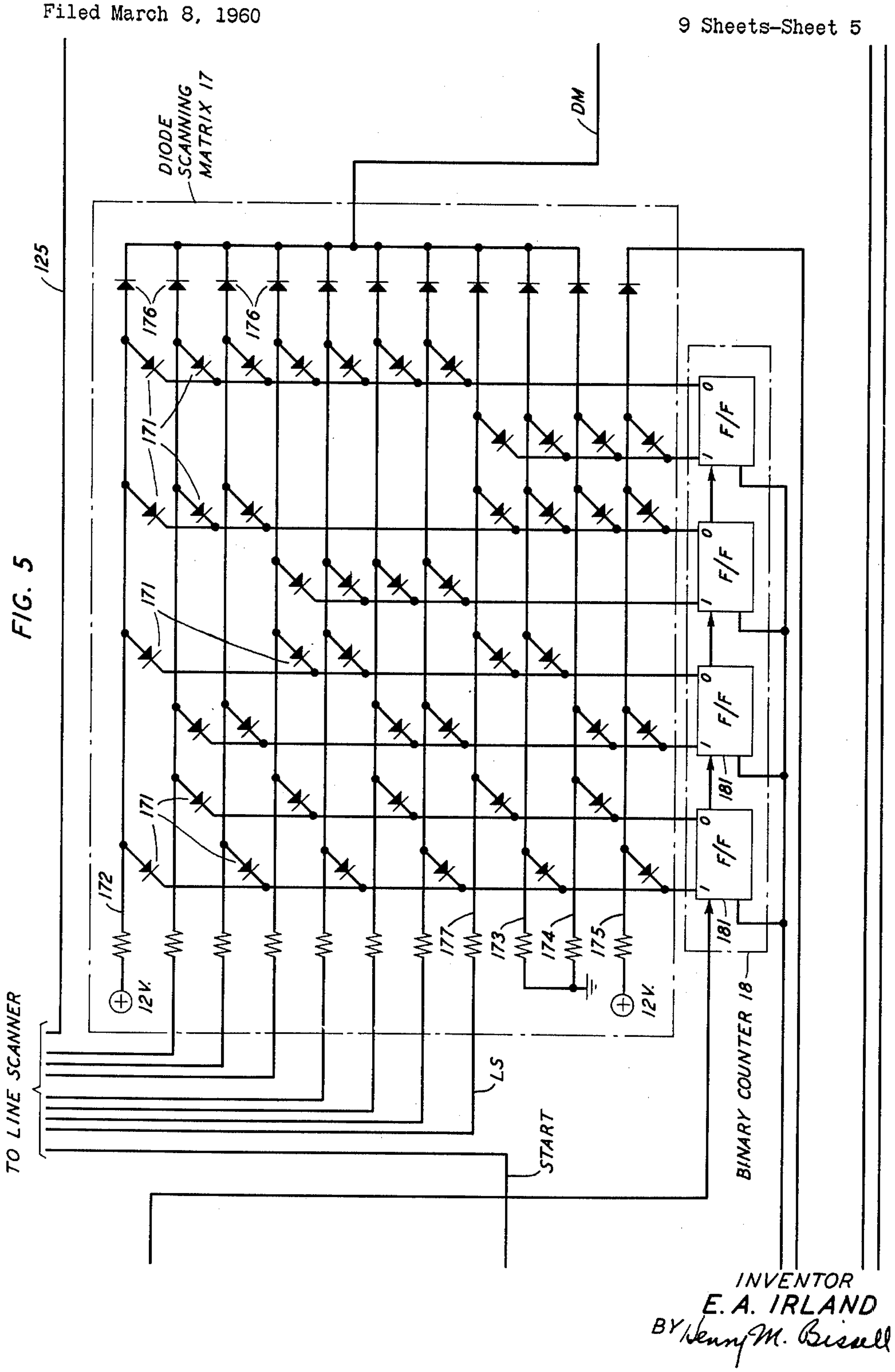
Figure 6:
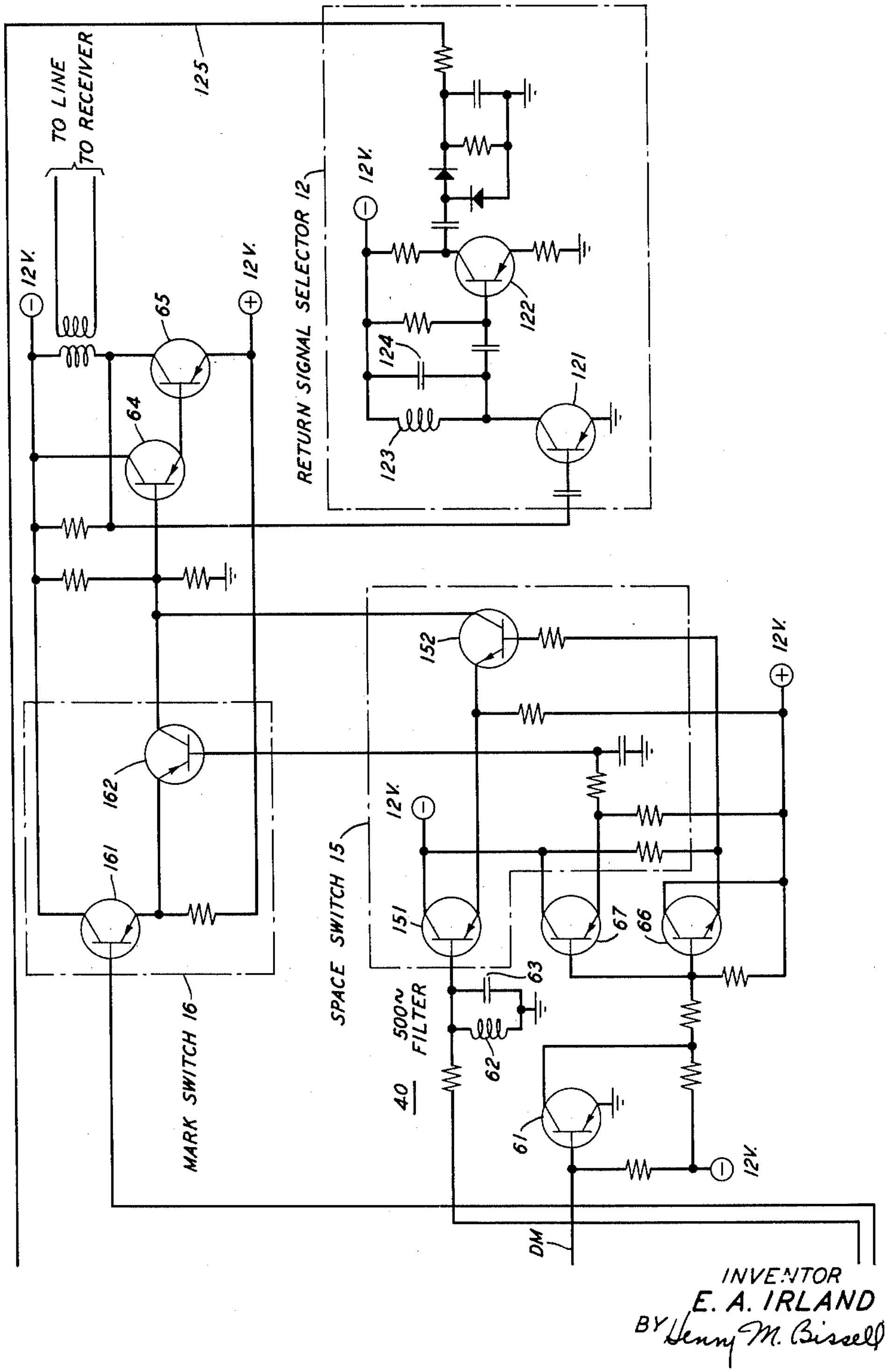

FIGS. 4, 5 and 6 depict a schematic diagram of the data transmitter of FIG. 2. In FIG. 4 there are shown the 1000-cycle oscillator 13, the binary counter 14, the AND gate 19 and the START flip-flop 9. Transistors 131 and 132 form a two-stage overloading amplifier with the collector of transistor 132 being coupled to the base of transistor 131 across a parallel circuit comprising inductor 133 and capacitor 134 which serve to govern the frequency of the oscillator. The output of transistor 132, further amplified and limited by transistor 135, appears as a 1000-cycle square wave which is applied to the binary counter 14. The counter comprises transistors 141 and 142 in a conventional flip-flop arrangement which generates a 500-cycle square wave signal in response to the 1000-cycle signal at its input. AND gate 19, utilizing transistor 191 in a known circuit arrangement, serves as a gate for the 500-cycle pulses received from the binary counter 14. This gate is under the control of the START flip-flop 9, having transistors 91 and 92 in a known bistable circuit, which is triggered by a start signal received from the line scanner. Upon the receipt of this start signal, transistor 91 conducts and holds the transistor 191 enabled for pulses from the binary counter 14 until the flip-flop 9 is reset by a signal applied from the diode scanning matrix 17 of FIG. 5 to indicate the completion of its scanning cycle. This reset signal is amplified through transistor 93 and then applied to the base of transistor 92 to remove the enabling potential applied to gate 19.

FIG. 5 shows the diode scanning matrix 17 and the binary counter 18 which controls it. The counter 18 comprises four conventional flip-flop stages, similar to the counter stage 14 of FIG. 4, which are controlled by the 500-cycle square wave signals that are received from the AND gate 19 of FIG. 4. The matrix 17 comprises a plurality of diodes 171 in a known configuration having input connections to the six-stage binary counter 31 and to the line change detector 30 of the line scanner shown in FIG. 1. Matrix control leads are connected to the flip-flops 181 so that each of the seven input leads from the line scanner (six leads from its six binary counter stages and the LS lead from its line change detector) applies its signal in turn to the data modulation (DM) control lead at the matrix output through a corresponding one of the diodes 176 arranged as an OR gate as the binary counter 18 progresses through its counting cycle. Thus the output of the diode scanning matrix 17 which is applied to transistor 61 of FIG. 6 displays a series of "MARKS" and "SPACES," respectively +12 volts and ground potential and each precisely two milliseconds in duration for a base frequency of 1000 cycles per second, in accordance with the potentials applied at the input leads of the matrix 17.

In addition to the connections between the line scanner and the matrix 17, it will be noted that the uppermost lead 172 is connected to a potential of +12 volts and leads 173 and 174 are connected to ground. Since scanning proceeds over the input leads from top to bottom the first signal applied to the transistor 61 is always a positive MARK signal, derived from lead 172 which serves to produce a start pulse at the beginning of the series of pulses sent to the data receiver.

The connections of leads 173 and 174 illustrate the manner in which the matrix 17 may be arranged to operate with line scanners of various capacities. If a line scanner having an eight-stage binary counter were substituted for the scanner 31 of FIG. 1, leads 173 and 177 would be connected to the additional outputs thereof, lead 174 would be connected to the LS lead, and the ground connections to lead 173 and 174 would be eliminated. Furthermore, it will be clear to those skilled in the art that the matrix 17 may be expanded to handle a larger number of input leads by including additional stages 181 in the binary counter 18 with additional diodes 171 and 176 associated therewith as desired.

Lead 175 which is the last one to be scanned in the matrix 17 is connected to the transistor 93 of FIG. 4 rather than to the DM connection leading to the transistor 61 of FIG. 6. Thus, after all of the matrix input leads have been scanned in succession, the lead 175 is enabled to apply a reset signal to the START flip-flop 9, signifying the completion of the scan cycle and causing the disabling of the AND gate 19. As the disabling signal is applied to the AND gate 19, it is differentiated by capacitor 192 and resistor 193, thereby producing a pulse which is applied to all of the flip-flops 181 of the binary counter 18 to restore them to their quiescent condition and prepare them for the next scanning cycle.

In FIG. 6 signals are received over three leads from the binary counter 14 and the oscillator 13 of FIG. 4 and the diode scanning matrix 17 of FIG. 5. The signal from the oscillator is a sine wave of 1000 cycles and is applied to the MARK switch 16. The signal from the binary counter 14 appears as a 500-cycle square wave which is transformed into a sine wave of the same frequency by 500-cycle filter 40 comprising the resonant tank circuit formed by inductor 62 and capacitor 63. Thus a 500-cycle sine wave is present at the input of the SPACE switch 15. The respective sine waves of 500 cycles and 1000 cycles are amplified through transistors 151 and 161 and applied through gates 152 and 162 to the line amplifier comprising transistors 64 and 65 in a known composite circuit arrangement.

The gating transistors 152 and 162 are respectively controlled by complementary transistors 66 and 67 which have a common input connection to the transistor 61 but which are individually responsive to pulses of opposite polarity. Accordingly, it can be seen that only one of the gates 152 and 162 will be conducting at any one time in response to pulses applied to the common input of transistors 66 and 67. The SPACE and MARK pulses from the matrix 17 are amplified and inverted by the transistor 61 after which they serve to energize transistor 66 or transistor 67, respectively, depending upon their polarity. A MARK signal causes transistor 67 to conduct, thus enabling the gating transistor 162 and permitting the application of a 1000-cycle sine wave from transistor 161 to the line amplifier including transistors 64 and 65 for eventual application to the line leading to the data receiver. Similarly, a SPACE pulse causes transistor 66 to conduct while cutting off transistor 67. Thus, the gating transistor 152 is energized and a 500-cycle sine wave is applied from the transistor 151 to the line amplifier and thence to the data receiver line.

Because the binary counter 18 is driven by 500-cycle signals from the binary counter 14 and the AND gate 19, it will be clear that each of the SPACE and MARK pulses derived from the associated matrix 17 has a time duration of two milliseconds. Thus, in response to these pulses, the line amplifier comprising transistors 64 and 65 receives exactly two cycles of the 1000-cycle sine wave for a MARK pulse and exactly one cycle of the 500-cycle sine wave for a SPACE pulse. Furthermore, in accordance with an aspect of my invention, the SPACE signal sine wave of 500 cycles, the MARK signal sine wave of 1000 cycles and the control signal which comprises a series of alternately positive and negative voltage steps separated by times which are integer multiples of two milliseconds are all in synchronism; that is, each voltage transition of the control signal occurs simultaneously with a positive going zero crossing of both the 500-cycle sine wave and the 1000-cycle sine wave. Accordingly, during the transmission of information over the line to the data receiver each shift between the 500-cycle and 1000-cycle frequencies occurs precisely at the point where the waveform is at zero, thus providing maximum energy within the signaling band and a minimum of signal harmonics. In accordance with my invention, the synchronization of the three signals mentioned above insures that the precise timing which produces this advantageous result is maintained, even though the primary oscillator frequency may shift somewhat. It will be clear, therefore, that my invention advantageously provides precision control of an output signal derived from a non-critical frequency standard.

FIG. 6 also depicts a return signal selector 12 comprising transistors 121 and 122 arranged with a filter network comprising inductor 123 and capacitor 124 tuned to a frequency of 3000 cycles. This circuit is connected to the line leading to the data receiver in order to select therefrom a 3000-cycle tone and, in response, generate a pulse which is applied as a return signal over lead 125 to the line scanner to produce a resumption of the scanning cycle therein. The generation of the 3000-cycle tone will be discussed in greater detail in connection with the data receiver.

Figure 7:
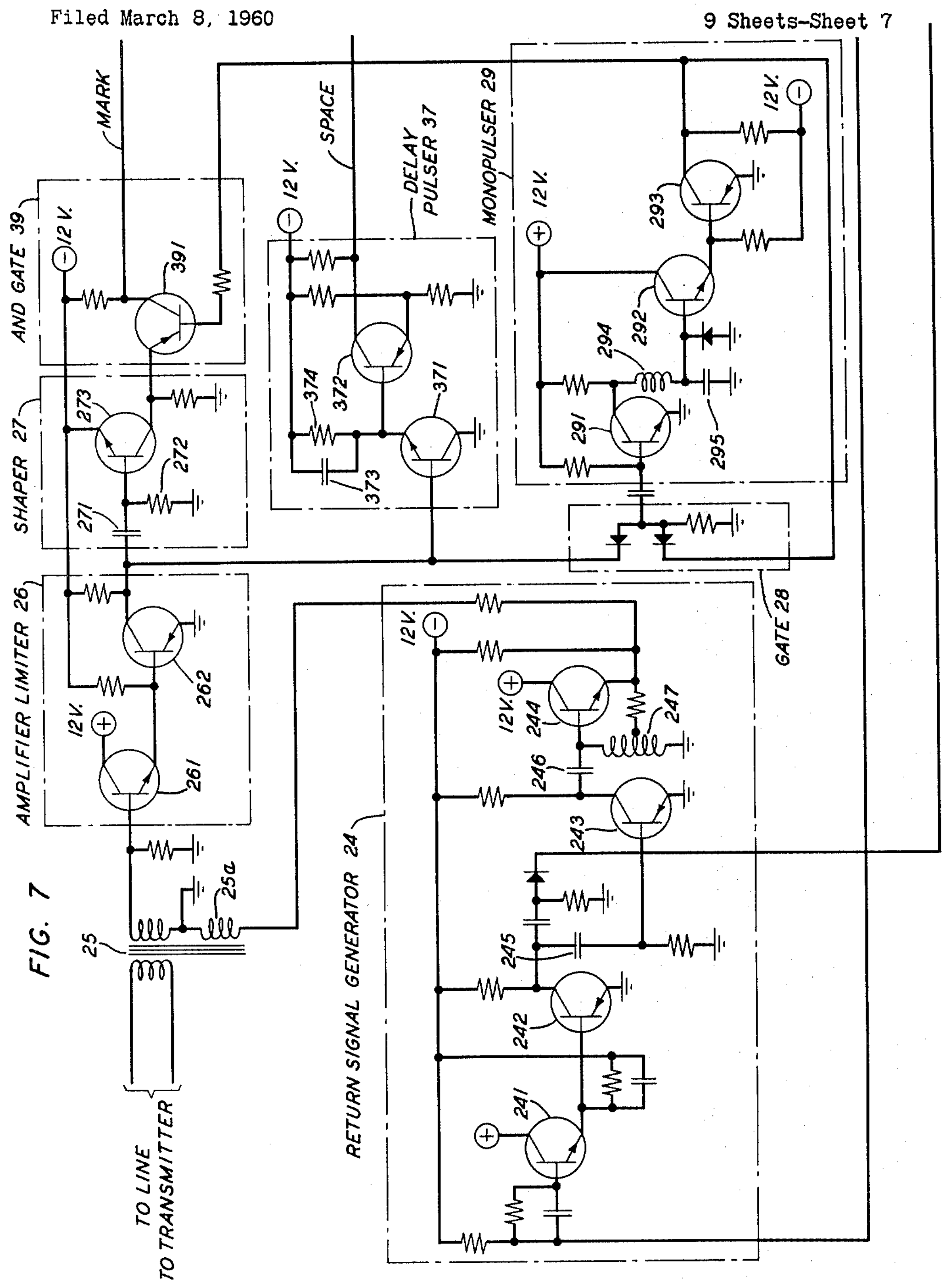
FIGS. 7 and 8 are schematic representations of the portion of the invention depicted in FIG. 3.
Figures 8, 9:
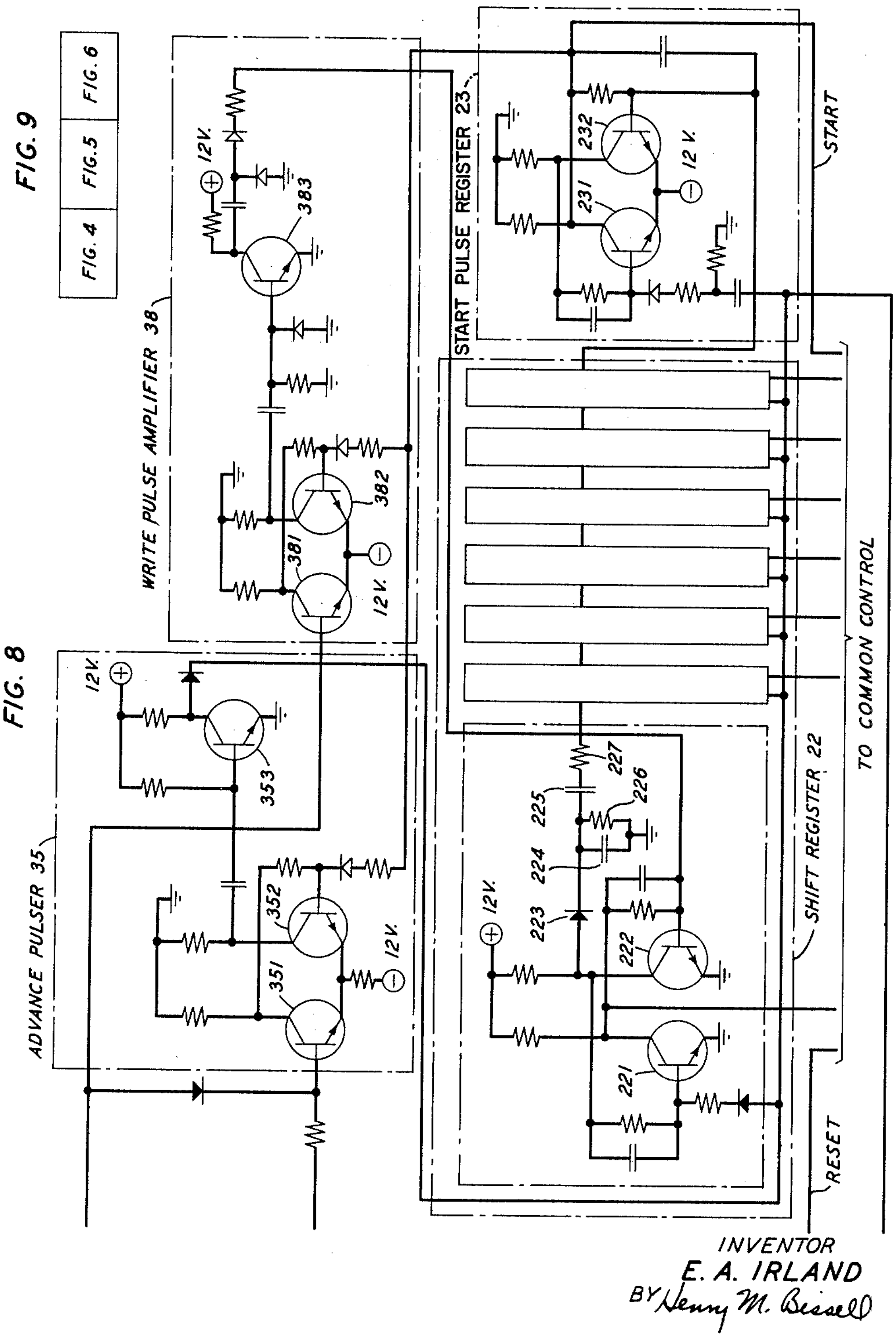
FIG. 9 is a diagram showing the relative positions of FIGS. 4, 5 and 6.

Turning now to FIGS. 7 and 8 which depict in schematic detail the data receiver of FIG. 3, signals from the data transmitter are applied through the transformer 25 to the amplifier-limiter stage 26 which consists of transistors 261 and 262 arranged in a known amplifying circuit. As a result of the limiting performed by this stage, the output waveform which is applied to the shaper 27, the delay pulser 37 and the gate 28 is a series of rectangular pulses of either 500 or 1000 pulses per second. In the shaper 27 these pulses are differentiated by the network consisting of capacitor 271 and resistor 272 and amplified by transistor 273 to produce a positive pulse of approximately 100 microseconds duration for each negative transition of the input signal. The negative output of the amplifier-limiter 26 also triggers monopulser 29 comprising transistors 291, 292 and 293 interconnected to develop an output pulse which is slightly delayed from the triggering signal and which has a durtaion of 1.5 milliseconds. This delay and time duration are controlled by the network consisting of inductor 294 and capacitor 295. The 1.5 millisecond signal from monopulser 29 is applied to the gate 28, thus blocking the passage of any further pulses to the monopulser 29 during this interval, and also to the AND gate 39 where transistor 391 is enabled for 1.5 milliseconds. If within this period a second signal is developed at the output of the shaper 27, which signal corresponds to a second cycle of the 1000-cycle frequency of the MARK signal, it passes through transistor 391 and appears on the MARK lead connected to the ADVANCE pulser 35 and to the WRITE pulse amplifier 38 in FIG. 8. If, on the other hand, no such signal appears, such a condition corresponds to a SPACE signal and the MARK lead is not energized.

At the same time the negative pulse from the amplifier-limiter 26 turns off transistor 371 in the DELAY pulser 37. This permits the potential at the base of transistor 372, connected thereto, ot decrease under the timing control of the network comprising capactior 373 and resistor 374. The time delay of this resistor-capacitor network is such that transistor 372 does not turn on if transistor 371 is held off only half a millisecond, which condition corresponds to the transmission of a 1000-cycle MARK signal from the data transmitter. However, if a 500-cycle SPACE signal is being transmitted, transistor 371 will be cut off for approximately one millisecond. This is sufficient time to permit transistor 372 to conduct and produce a positive signal on the SPACE lead leading to ADVANCE pulses 35 in FIG. 8. Thus it can be seen that the ADVANCE pulser 35, comprising transistors 351 and 352 in a known amplitude detector circuit connected to amplifying transistor 353, is energized by the appearance of a signal on either of the MARK and SPACE leads. However, the WRITE pulse amplifier 38, including transistors 381 and 382 in a conventional amplitude detector circuit coupled to a differentiating amplifier including transistor 383, is energized only by signals on the MARK lead.

FIG. 8 also depicts a shift register 22 comprising seven similar stages. The first stage, which is typical, is shown in detail as comprising transistors 221 and 222 in a familiar flip-flop configuration. It includes a pulse stretching network comprising the diode 223, capacitors 224 and 225 and resistors 226 and 227 which, if a binary "1" is stored in that stage of the shift register, serve to transmit a SET pulse to the succeeding stage after a RESET pulse has been applied from the ADVANCE pulser 35. Connected to the output of the shift register 22 is an additional stage 23 comprising transistors 231 and 232, also in a known flip-flop circuit. This circuit differs from the stages of the shift register 22 principally in that it is connected between ground and −12 volts in order thta its output in the active state may be applied as an inhibiting pulse to saturate transistors 352 and 382 and thereby prevent further operation of the ADVANCE pulser 35 and WRITE pulse amplifier 38. The output of the start pulse register 23 is also applied to common control equipment to indicate that the shift register 22 is ready with information to be read. Since, as was already mentioned, the first signal in a series of information signals from the data transmitter is a MARK signal, the corresponding active stage is established in the start pulse register 23 as the last of the information signals in a particular series reaches the shift register 22.

Once the common control equipment has recorded the information stored in the shift register 22 over the individual leads connected from each stage thereof, it applies a RESET signal which is directed to the return signal generator 24 in FIG. 7 comprising transistors 241, 242, 243 and 244. This RESET pulse is amplified through transistor 241 and cuts off transistor 242 for approximately 30 milliseconds. During the first six milliseconds of this period the capacitor 245 passes sufficient current into the base of transistor 243 to cause it to saturate. This effectively grounds capacitor 246, thus completing the tank circuit including inductor 247 in the Hartley oscillator of transistor 244. Accordingly, a six-millisecond burst of 3000-cycle tone is applied to the winding 25*a* of transformer 25 and thence over the line to the data transmitter to signal the resumption of line scanning in a manner which has already been described.

Approximately 30 milliseconds later when the transistor 242 again conducts, a one-millisecond pulse is applied to each of the stages in the shift register 22 and to the start pulse register 23 to restore these stages to the negative state. Since this pulse is approximately ten times as long as the persistence of the interstage shift pulses, it clears the data from the shift register 22 and the data receiver is left ready to receive further information from the data transmitter.

Figure 10:
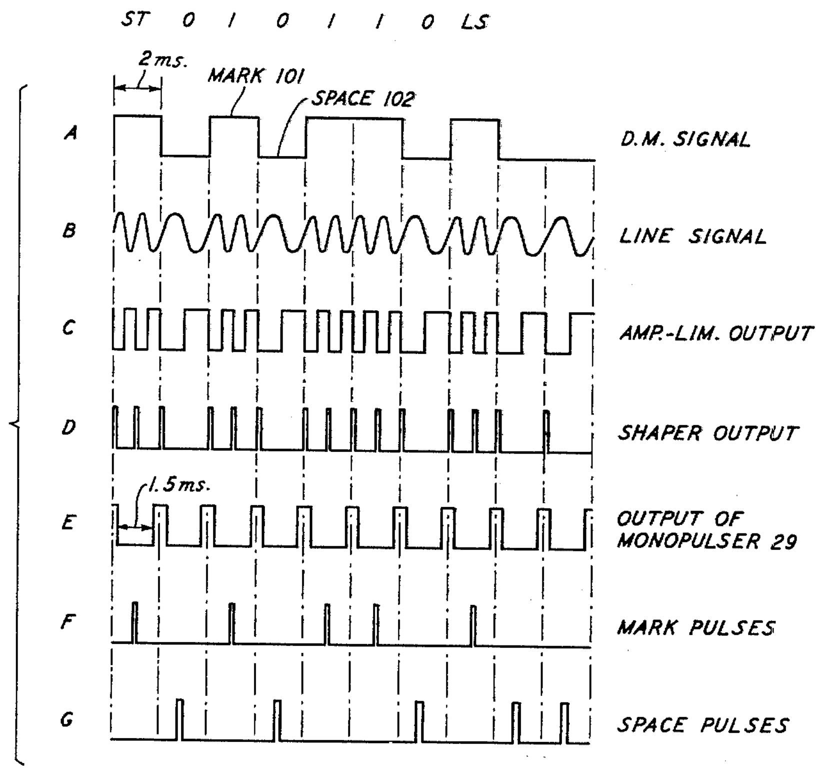
FIG. 10 is a plot of waveforms illustrating signals at different points in the embodiment of my invention depicted in FIGS. 1 through 8.

For purposes of illustration, let us consider that a specific series of binary pulses, which may be considered an information "word," is to be transmitted from the line scanner to the common control circuit. Such a word contains a START signal to initiate action by the common control equipment, the binary designation of a particular line requesting service, and an indication of the type of service requested. FIG. 10 illustrates various waveforms occurring at different portions of the above-described embodiment of this invention which correspond to a service request for call initiation (subset off hook) originating from the line having the binary designation 010110.

Waveform A depicted in FIG. 10 represents the signal appearing on the data modulation (DM) control lead which carries the output of the diode scanning matrix of FIG. 5. This signal consists of either MARKS or SPACES, each two milliseconds in duration. A MARK is a positive 12-volt potential while a SPACE is a ground, or zero, potential corresponding respectively to binary "1's" and "0's" applied from the line scanner. As has already been explained, the initial signal is always a MARK since it is derived from a +12 volt bias source within the diode scanning matrix 17. Furthermore, in this embodiment of my invention, the binary word is followed by two SPACES because the diode scanning matrix 17, designed for operation with an eight-stage binary counter within the line scanner, is actually operating with a six-stage counter therein and so has two idle leads.

My invention advantageously protects against noise interference on the line between data transmitter and receiver by continuously transmitting a strong signal which, when limited at the receiver as described above, completely eliminates such interference. When no information signals are present on the DM lead at the output of the diode scanning matrix, the SPACE switch 15 of FIG. 2 is enabled and, as a result, a steady signal of 500-cycle tone is transmitted over the line. In the receiver the amplifier-limiter stage 26 of FIG. 3 clips this signal near its zero base line and a series of SPACE pulses is produced therefrom. These pulses do not change the shift register 22 from its reset state and therefore have no apparent effect insofar as signaling the common control equipment is concerned. However, the 500-cycle tone serves to saturate the amplifier-limiter stage 26, thus precluding the possibility of it acting on a noise signal to generate spurious information signals which would represent errors in the information transfer process.

The data modulation signal of waveform A selectively enables the MARK switch 16 and the SPACE switch 15 so that a two-millisecond signal of 1000-cycle tone is applied to the line between the data transmitter and the data receiver for each MARK while a two-millisecond signal of 500-cycle tone is applied to the line for each SPACE. The line signal is represented by waveform B of FIG. 10 where it can be seen that two cycles of a sine wave in two milliseconds represent a MARK while one cycle of a sine wave in two milliseconds represents a SPACE. In accordance with an already explained aspect of my invention, it is clear from waveform B that the transitions between 1000-cycle and 500-cycle signals occur at the zero crossings of the respective waveforms, thus minimizing transient voltages and providing maximum energy within the signaling band.

Waveform C of FIG. 10 illustrates the signal which is present at the output of the amplifier-limiter stage 26 of FIG. 3. This waveform is simply the waveform B amplified and clipped in the vicinity of the zero signal level. The shaper 27 of FIG. 3 produces a short 100-microsecond pulse at its output for each negative transition of the waveform C. These pulses are illustrated in waveform D of FIG. 10. In addition, the monopulser 29 of FIG. 3 develops a slightly delayed 1.5-millisecond negative output for those negative transitions of the waveform C which reach the monopulser 29 through its input gate 28. The output of monopulser 29, shown by waveform E in FIG. 10, is applied to the AND gate 39 where its negative signal enables that gate. Thus it can be seen that only those pulses of waveform D which occur during a negative gating pulse of waveform E will appear at the output of the AND gate 39. This output is shown in waveform F of FIG. 10 and the pulses thereof correspond to the MARK pulses of the waveform A. Similarly, because of the operation of the delay pulser 37 already explained above in connection with FIG. 7, a SPACE pulse is produced at the output thereof only if its input is maintained negative for approximately .8 millisecond by waveform C. These pulses are depicted in wavefrm G of FIG. 10 and can occur only during a 500-cycle signal of waveform B which corresponds to a SPACE of waveform A. It is clear, therefore, that either MARK or SPACE pulses such as are shown in waveforms F and G will be generated within each two-milliseconds time interval during the application of a line signal such as is shown in waveform B. These MARK and SPACE pulses are stored in the shift register 22 for transition to the common control equipment in the manner already described.

It is to be understood that the above-described arrangements are illustrative of the principles of the invention. Numerous other arrangements may be devised by those skilled in the art without departing from the spirit and scope of the invention.

What is claimed is:

1. An information transfer system comprising a telephone line transmission path, a plurality of leads presenting respective information signals to be transferred over said path, means for generating distinct synchronous sine wave signals for application to said path in correspondence with said information signals, said distinct sine wave signals bearing a harmonic relation to each other, means for producing square-wave pulses from one of said sine wave signals, means under the control of said square-wave pulses for shifting said path from one to the other of said distinct signals at the zero crossings of their respective waveforms, said path-shifting means comprising synchronous scanning means for converting said information signals into a series of binary digital pulses in successive equal time intervals, and means connected to said path for receiving said distinct signals.

2. An information transfer system comprising a telephone line transmission path, a plurality of leads presenting respective information signals to be transferred over said path, means for generating distinct synchronous sine wave signals bearing a harmonic relation to each other for application to said path in correspodence with said information signals, said generating means comprising a signal source of a first frequency and frequency-dividing means for producing a subharmonic of said first frequency, said signal source including means for developing both sine wave and square wave output signals and said frequency-dividing means including a bistable stage responsive to the square wave output signal from said signal source, means for shifting said path from one to the other of said distinct sine wave signals at the zero crossings of their respective waveforms, and means connected to said path for receiving said distinct signals.

3. An information transfer system comprising a telephone line transmission path, a plurality of leads presenting respective information signals to be transferred over said path, means for generating distinct synchronous sine wave signals for application to said path in correspondence with said information signals, said distinct sine wave signals bearing a harmonic relation to each other, means for shifting said path from one to the other of said distinct signals at the zero crossings of their respective waveforms, and means connected to said path for receiving said distinct signals comprising first and second timing means, a shift register, and means for controlling said shift register in response to said first and second timing means, said first timing means comprising a monopulser producing an output pulse of duration greater than the period of the first of said sine wave signals but less than the period of the second of said sine wave signals.

4. An information transfer system comprising a telephone line transmission path, a plurality of leads presenting respective information signals to be transferred over said path, means for generating distinct synchronous sine wave signals for application to said path in correspondence with said information signals, said distinct sine wave signals bearing a harmonic relation to each other, means for shifting said path from one to the other of said distinct signals at the zero crossings of their respective waveforms, and means connected to said path for receiving said distinct signals including means for producing a sine wave signal of a frequency which is different from said distinct sine wave signals for transmission over said path from said receiving means to the remote end thereof, said sine wave producing means comprising an oscillator circuit including a first transistor, a tank circuit and a second transistor in series with said tank circuit for controlling the operation of said oscillator circuit.

5. In an information transfer system, a receiving circuit comprising a transmission path for carrying synchronous harmonically related signals in successive time intervals, information storage means having first and second input control leads, first means connected to said path for applying a pulse to said first control lead upon occurrence of a first one of said harmonically related signals on said transmission path, said first means comprising gating means in series with said first control lead and a monopulser having a predetermined pulse duration related to said harmonically related signals for enabling said gating means during the second cycle of the higher frequency of one of said harmonically related signals, and second means connected to said path for applying a pulse to said second control lead upon the occurrence of a second of said harmonically related signals on said transmission path.

6. An information transfer system comprising a voice frequency transmission path, a source of fixed length binary coded messages, means for encoding the individual digits of said messages as one of first and second harmonically related frequencies, means for impressing said frequencies on one end of said path for transmission in one direction thereover, means at the other end of said path for decoding said frequencies as individual binary digits, information storage means of fixed capacity for accepting said decoded binary digits, means responsive to the filling of said storage means for generating a return signal at a third frequency different from said first and second frequencies for transmission in the opposite direction along said path, and means at the one end of said path for detecting said third frequency as a signal that one message has been completely received and stored and that a further message can be transmitted.

7. A data transmission system comprising a voice frequency transmission path, a source of binary coded information, a source of harmonically related alternating current signals, means for switching to said transmission path at the waveform zero crossing points under the control of said information source a first one of said alternating-current signals to represent a first binary digit and a second one of said alternating-current signals to represent a second binary digit, information storage means having a pair of input leads, first means connected to said transmission path for producing pulses at one of said input leads in response to said first signal on said transmission path, and second means also connected to said transmission path for producing pulses on the other of said input leads in response to said second signal on said transmission path.

8. An information transfer system comprising a telephone line transmission path, a plurality of leads presenting respective information signals to be transferred over said path, means for generating distinct synchronous sine wave signals for application to said path in correspondence with said information signals, said distinct sine wave signals bearing a harmonic relation to each other, means for shifting said path from one to the other of said distinct signals at the zero crossings of their respective waveforms, and means connected to said path for receiving said distinct signals.

9. An information transfer system in accordance with claim 2 wherein said frequency dividing means also includes a filter tuned to said sub-harmonic for converting the output of said bistable stage to a sine wave signal.

10. An information transfer system in accordance with claim 1 further comprising means for blocking said square wave pulses from said scanning means until a predetermined signal is applied to said blocking means.

11. An information transfer system in accordance with claim 3 further including gating means connected to said monopulser, said path, said shift register control means and said gating means being enabled by said monopulser.

12. An information transfer system in accordance with claim 3 wherein said second timing means comprises means for producing a delayed signal, the delay of said signal being greater than a half period of said first sine wave signal but less than the half period of said second sine wave signal.

13. An information transfer system in accordance with claim 4 wherein said sine wave signal producing means includes means for disabling said shift register controlling means during the operation of said oscillator circuit.

14. In an information transfer system, a transmitting circuit including a low frequency signal path, means for generating a first carrier frequency within the frequency band of said transmission path, means for producing a second carrier frequency which is a sub-harmonic of said first carrier frequency, information storage means, means for reading information out of said storage means in successive time intervals, means for synchronizing said information reading means with said first and second carrier frequencies, and signal selecting means for alternatively applying said first and second carrier frequencies to said transmission path in accordance with the output of said information reading means.

15. In an information transfer system, the transmitting circuit of claim 14 wherein said signal selecting means includes means for shifting between said first and second carrier frequencies at the zero crossings of their respective waveforms.

16. In an information transfer system, a receiving circuit comprising a transmission path carrying synchronous harmonically related signals in successive time intervals, information storage means having first and second input control leads, first means connected to said path for applying a pulse to said first control lead upon the occurrence of a first one of said harmonically related signals on said transmission path, and second means connected to said path for applying a pulse to said second control lead upon the occurrence of a second of said harmonically related signals on said transmission path.

17. In an information transfer system, a receiving circuit in accordance with claim 5 wherein said second means comprises delay means having a predetermined period of delay related to the periods of said harmonically related signals and means for resetting said delay means at each successive cycle of said harmonically related signals.

18. In an information transfer system, a receiving circuit in accordance with claim 16 further including signal generating means connected to said information storage means for applying a signal to said path after said harmonically related signals have been received.

19. An information transfer system in accordance with claim 1 wherein said path shifting means further comprises a pair of complementary transistors having a common input connection for respectively responding to pulses of opposite polarity.

References Cited in the file of this patent

UNITED STATES PATENTS

| | | |
|---|---|---|
| 2,600,268 | Sagalyn | June 10, 1952 |
| 2,740,109 | Okrent | Mar. 27, 1956 |
| 2,879,387 | Kahn | Mar. 24, 1959 |
| 2,917,583 | Burton et al. | Dec. 15, 1959 |
| 2,936,338 | James et al. | May 10, 1960 |
| 2,950,471 | Hoeppner | Aug. 23, 1960 |
| 2,972,137 | Dunn | Feb. 14, 1961 |